United States Patent [19]
Watanabe et al.

[11] Patent Number: 5,818,801
[45] Date of Patent: Oct. 6, 1998

[54] SHOCKPROOF OPTICAL REPRODUCTION DEVICE

[75] Inventors: Tomofumi Watanabe; Tetsuo Yamazaki, both of Gifu-ken, Japan

[73] Assignee: Sanyo Electric Co., Ltd., Osaka, Japan

[21] Appl. No.: 655,348

[22] Filed: May 21, 1996

[30] Foreign Application Priority Data

Jun. 30, 1995 [JP] Japan .................................. 7-166155
Jun. 30, 1995 [JP] Japan .................................. 7-166165

[51] Int. Cl.$^6$ .................................................. G11B 17/22
[52] U.S. Cl. ............................................ 369/33; 369/32
[58] Field of Search ............................... 369/33, 32, 47, 369/48, 54, 58; 358/126

[56] References Cited

U.S. PATENT DOCUMENTS 5,365,502 11/1994 Misono ....................... 369/33
5,471,442 11/1995 Shimizume ................. 369/32
5,508,983 4/1996 Nakamura et al. .......... 369/32

*Primary Examiner*—Tan Dinh
*Attorney, Agent, or Firm*—Sheridan Ross, P.C.

[57] ABSTRACT

A data reproduction apparatus is provided to supply audio data without sound skipping caused by positional deviation in read position, while avoiding an increase in circuit area. In one embodiment, the data reproduction apparatus includes a reading unit for optically reading data recorded on a recording medium. A first signal processing circuit produces a format data signal based on the data read by the reading unit. A second signal processing circuit performs a demodulation process on the format data signal to produce a demodulated format data signal including main data and subcode data. The second signal processing circuit also subjects the main data signal to a decoding process to produce a reproduced data signal. A buffer memory temporally stores the reproduced data signal. A shockproof controller controls the writing and reading of the reproduced data signal into and from the buffer memory. An operation controller causes the shockproof controller to stop the writing of the reproduced data signal in the buffer memory and causes the reading unit to repeat the reading of the data associated with the interrupted format data signal when the format data signal produced by the first signal processing circuit is interrupted. Further, when one of the operation controller and the shockproof controller receives the subcode data signal from the second signal processing circuit, the shockproof controller restarts the writing into the buffer memory of the reproduced data signal associated with the repeated reading of the data associated with the interrupted format data signal.

7 Claims, 5 Drawing Sheets

SHOCKPROOF OPTICAL REPRODUCTION DEVICE

BACKGROUND OF THE INVENTION

1. Field of the Invention

The present invention relates to a data reproduction apparatus which reads data previously recorded on a disk and reproduces original data. More particularly, the invention relates to a data reproduction apparatus equipped with a shockproof function for continuously supplying reproduced original data irrespective of vibration or shock.

2. Description of the Related Art

A compact disk (CD) player for playing an audio CD should mechanically control the number of rotations of each disk and the read position of its pickup in order to read data from the disk at a constant speed. This mechanical control cannot cope with a positional deviation of the read position caused by slight vibration. This positional deviation causes data signals to be read discontinuously from the disk, so that audio signals are also produced discontinuously, i.e., sounds are skipped. CD players, which often experience vibration when in use, are equipped with the shockproof function that permits continuous supply of audio signals regardless of a positional deviation of the read position.

FIG. 1 is a block diagram showing a CD player having a shockproof function. The CD player comprises a CD pickup 1, a pickup controller 3, an analog signal processor 4, a digital signal processor 5, a shockproof controller 6, a buffer RAM 7 and a control microcomputer 8.

The CD pickup 1 receives reflections of the light that is irradiated on a disk 2, and produces a voltage signal according to the intensity of the received light. The pickup controller 3 controls the read position of the CD pickup 1 so that the CD pickup 1 can read previously recorded data from the disk 2 in the correct order. The analog signal processor 4 shapes the waveform the voltage signal supplied from the CD pickup 1 while reading a change in the voltage value, and produces an EFM (Eight to Fourteen Modulation) signal. The digital signal processor 5 receives an EFM signal from the analog signal processor 4, and performs signal processing, such as EFM demodulation and decoding according to CIRC (Cross-Interleave Reed-Solomon Code), based on a predetermined CD format.

The shockproof controller 6 receives an audio data signal from the digital signal processor 5, and temporarily writes the audio data signal into the buffer RAM 7. The shockproof controller 6 continuously reads an audio data signal in a given cycle from the buffer RAM 7 and supplies it to a circuit at a subsequent stage. For example, the circuit at the subsequent stage may be a D/A converter which converts the digital audio data signal to an analog audio data signal. The control microcomputer 8 has a single chip architecture, and incorporates a memory where a program for controlling the individual circuits 3–6 is stored. When detecting a deviation of the read position of the CD pickup 1, the control microcomputer 8 supplies to the pickup controller 3 a signal to return from the shifted read position to the original read position. The control microcomputer 8 also controls the individual circuits 3 to 5 in such a manner as to be synchronous with the operation of the shockproof controller 6.

The CD pickup 1 is designed so that the speed of reading data from the disk 2 is several times faster than the speed of reading an audio data signal from the buffer RAM 7 by the shockproof controller 6. Hence, the supply of the data read from the disk 2 precedes the supply of the audio data signal from the shockproof controller 6 by the amount of data temporarily stored in the buffer RAM 7. When data is discontinuously read from the disk 2 due to a deviation of the read position, the control microcomputer 8 stops the reading operation of the CD pickup 1 and shifts the CD pickup 1 to the original read position from the deviated (shifted) read position. During this stop period, the shockproof controller 6 reads an audio data signal from the buffer RAM 7 and thereby continuously supplies the audio data signal.

When the reading operation of the CD pickup 1 is restarted, the shockproof controller 6 restarts writing audio data to the buffer RAM 7. To ensure the consecutiveness of the contents of data at this time, the writing of second audio data having the same contents as the first audio data, which had been stored last at the time the writing was inhibited, should be started following the first audio data. It is not possible to determine the timing of restarting the writing of the second audio data by only controlling the read position of the CD pickup 1. In this respect, the shockproof controller 6 has a circuit for temporarily holding the first audio data. The controller 6 further has a circuit for determining a matching of the held first audio data with the second audio data. When both data coincide with each other, writing of the second audio data into the buffer RAM 7 is restarted. In this case, multiple second audio data each having the same contents as the first audio data may be supplied. In view of this probable event, the shockproof controller 6 retains the first audio data for a given period of time. The shockproof controller 6 determines the timing of restarting the writing of audio data by confirming the second audio data among a group of audio data that have been supplied during that period.

The shockproof controller 6 however needs the determining circuit in addition to the data holding circuit, which results in an increase in the area of the circuit for controlling the writing of audio data and a lowering in the writing speed. One way of eliminating such an inconvenience is to reduce the amount of the first audio data being retained in the shockproof controller 6. This approach may however cause an erroneous determination on the timing of the writing of the audio data following a positional deviation.

Also, some of recent CD-ROM systems which use CDs as read only memories (CD-ROMs) for computers are equipped with a function of playing audio CDs as well as CD-ROMs. The ordinary CD-ROM system is compatible with an audio CD player in reading data, EFM demodulation and CIRC decoding. To play an audio CD, the CD-ROM system should be additionally provided with a D/A converter, for example. However, the incorporation of the shockproof function in such a CD-ROM system increases the circuit occupying area.

SUMMARY OF THE INVENTION

Broadly speaking, the present invention relates to a data reproduction apparatus which is designed to supply audio data without sound skipping due to positional deviation in read position, while avoiding an increase in circuit area. The invention can be implemented in numerous ways, including as a data reproduction apparatus or a CD-ROM system.

A data reproduction apparatus according to one embodiment of the invention includes: a reading unit for optically reading data recorded on a disk as a recording medium; a first signal processing circuit for producing a format data signal based on the data read by the reading unit; a second signal processing circuit for performing a demodulation process on the format data signal supplied from the first signal processing circuit to produce a demodulated format data signal including main data and subcode data, for producing a main data signal and a subcode data signal from the demodulated format data signal, and for subjecting the main data signal to a decoding process to produce a reproduced data signal; a buffer memory for temporally storing the reproduced data signal; a shockproof controller, coupled between the second signal processing circuit and the buffer memory, for controlling the writing and reading of the reproduced data signal into and from the buffer memory; and an operation controller, coupled to the reading unit, the first and second signal processing circuits and the shockproof controller. When the format data signal produced by the first signal processing circuit is interrupted, the operation controller causes the shockproof controller to stop the writing of the reproduced data signal in the buffer memory and causes the reading unit to repeat the reading of the data associated with the interrupted format data signal. Further, when one of the operation controller and the shockproof controller receives the subcode data signal from the second signal processing circuit, the shockproof controller restarts the writing into the buffer memory of the reproduced data signal associated with the repeated reading of the data associated with the interrupted format data signal.

Another embodiment of the invention pertains to a CD-ROM decoder for use in a data reproduction apparatus having a buffer memory storing data read from a disk as a recording medium. The data includes at least one of audio digital data and CD-ROM digital data. The CD-ROM decoder includes: an input interface for providing one of the audio and the CD-ROM digital data to the buffer memory; an error correction circuit for correcting an error contained in the CD-ROM digital data stored in the buffer memory; an output interface circuit for transferring the error- corrected CD-ROM digital data from the buffer memory to an external computer; an audio data reproduction circuit for reading the audio digital data from the buffer memory to output it therefrom at a predetermined period; and an operation controller for controlling the output interface circuit and the audio data reproduction circuit. The operation controller allows the output interface circuit to operate when the data includes the CD-ROM digital data and allows the audio data reproduction circuit to operate when the data includes the audio digital data.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings, in which.

DETAILED DESCRIPTION OF THE PREFERRED EMBODIMENTS

First Embodiment

Figure 1:
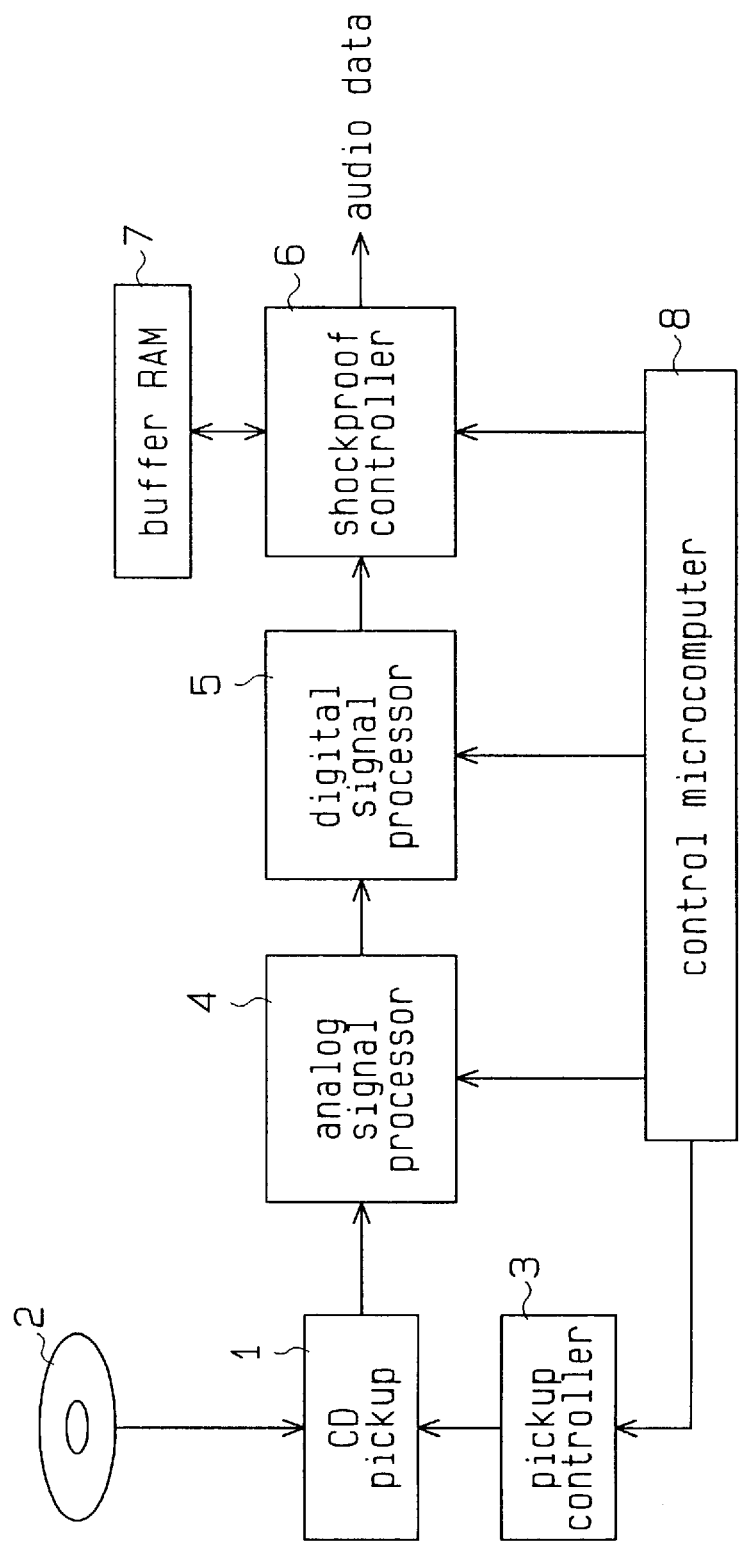
FIG. 1 is a block diagram showing a conventional CD data reproduction apparatus having a shockproof function.
Figure 2:
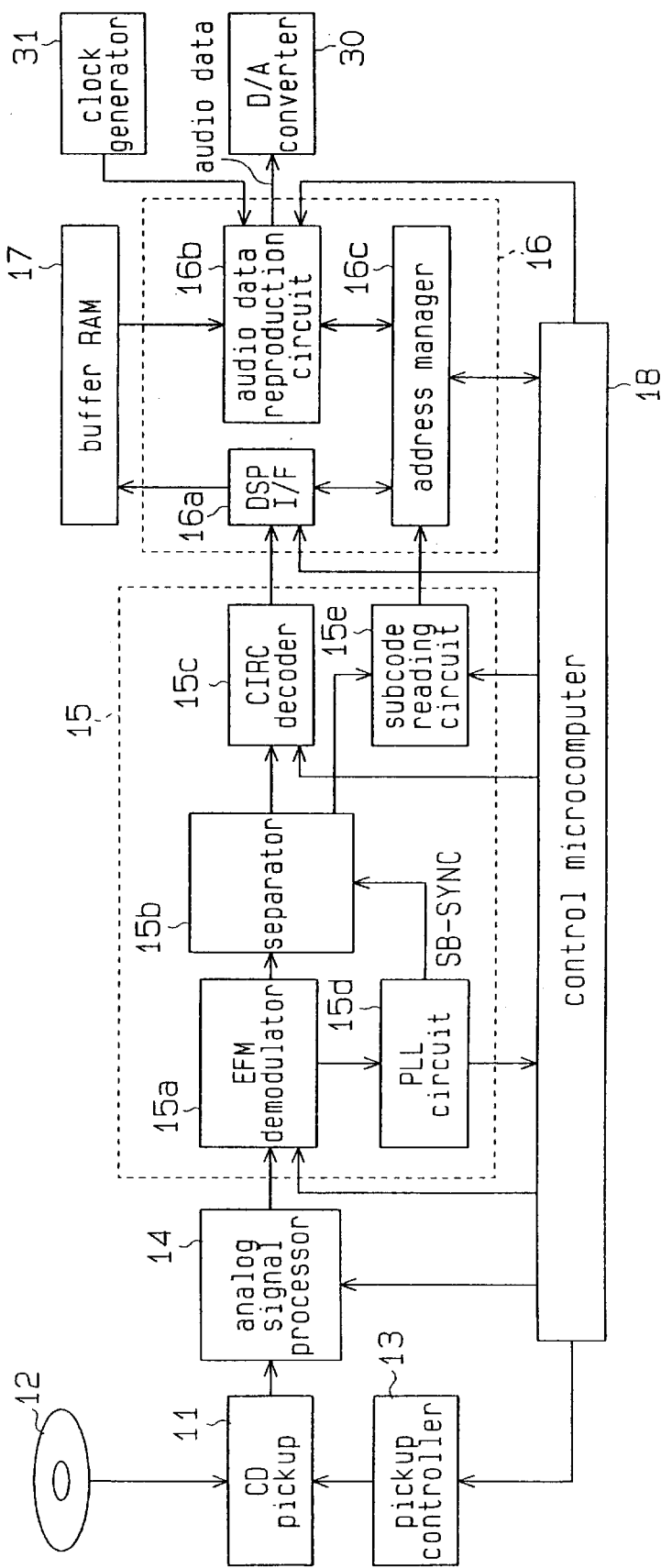
FIG. 2 is a block diagram illustrating a CD data reproduction apparatus for use in an audio system according to a first embodiment of the invention.

FIG. 2 presents a block diagram illustrating a CD data reproduction apparatus which is used in an audio system according to a first embodiment of the invention. The data reproduction apparatus comprises a CD pickup 11, a pickup controller 13, an analog signal processor 14, a digital signal processor 15, a shockproof controller 16, a buffer RAM 17 and a control microcomputer 18.

Figure 3:
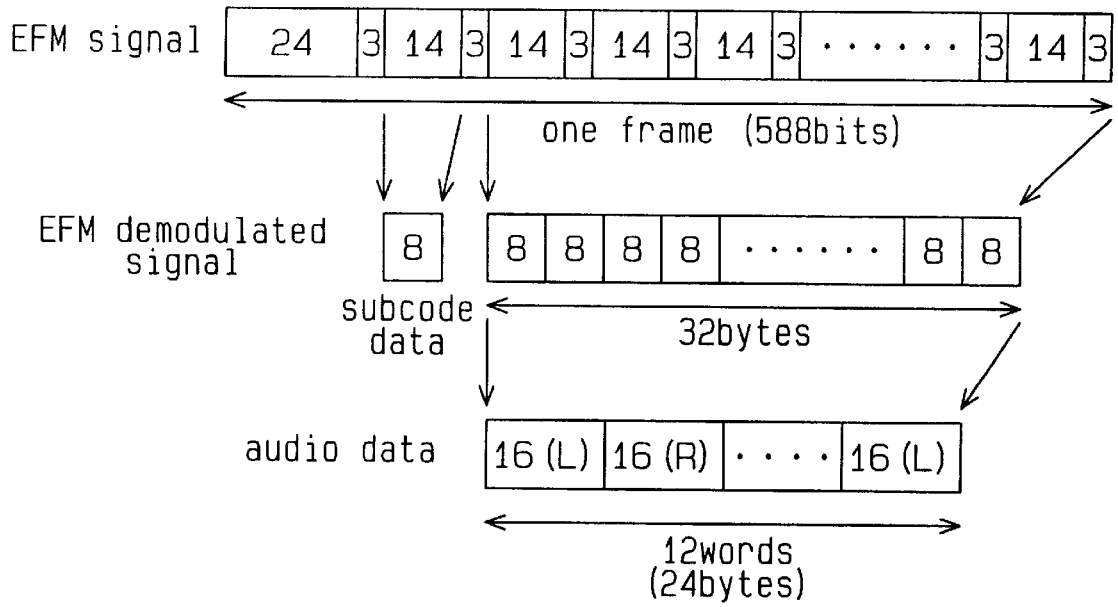
FIG. 3 is a diagram depicting how data read from a CD is processed.

The CD pickup 11 receives reflections of the light that is irradiated on a disk 12, and produces a voltage signal according to the intensity of the received light. The disk 12 serves as a recording medium and is rotated at a predetermined speed by a drive circuit (not shown) which undergoes servo control. The pickup controller 13 controls the read position of the CD pickup 11 so that the CD pickup 11 can read previously recorded data from the disk 12 in the correct order. The analog signal processor 14 shapes the waveform of the voltage signal supplied from the CD pickup 11 while reading a change in the voltage value, and produces an EFM (Eight to Fourteen Modulation) signal. The EFM signal is comprised of a plurality of frames each consisting of 588 bits, as shown in FIG. 3. Each frame consists of a 24-bit frame sync pattern at the top followed by alternately arranged 3-bit link groups and 14-bit data groups.

As shown in FIG. 2, the digital signal processor 15 includes an EFM demodulator 15a, a separator 15b, a CIRC (Cross-Interleave Reed-Solomon Code) decoder 15c, a PLL (Phase-Locked Loop) circuit 15d and a subcode reading circuit 15e. The EFM demodulator 15a receives an EFM signal from the analog signal processor 14 and performs EFM demodulation on the EFM signal to produce an EFM demodulated signal. Consequently, the EFM demodulator 15a converts the 14-bit data groups to 8-bit data groups when producing the EFM demodulated signal, as shown in FIG. 3. The EFM demodulated signal includes subcode (or user bit) data and main data. The subcode data consists of one byte (8 bits), and is produced by using the first 14-bit EFM data following the frame sync pattern (24 bits). The main data has a 32-byte structure and is produced by using the remaining bits of EFM data. The separator 15b receives the subcode data and main data from the EFM demodulator 15a and separates both data from each other. The separating operation is controlled by a subcode sync signal SB-SYNC which is produced by the PLL circuit 15d which will be discussed later. The separator 15b supplies the main data to the CIRC decoder 15c and the subcode data to the subcode reading circuit 15e.

Figure 4:
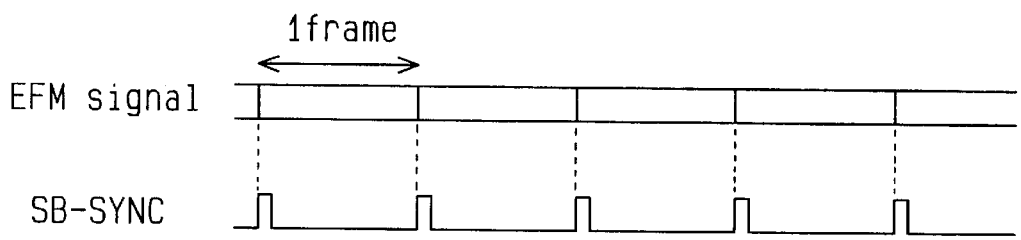
FIG. 4 is a diagram showing the timing of supplying a subcode sync signal.

The CIRC decoder 15e executes CIRC decoding in accordance with the Reed-Solomon code of the main data to produce audio data consisting of 12 words as shown in FIG. 3. The audio data is supplied to the shockproof controller 16. The PLL circuit 15d receives an EFM signal and acquires a sync signal therefrom. The PLL circuit 15d has a phase-locked loop which is responsive to the obtained sync signal, and produces the subcode sync signal SB-SYNC synchronous with the frame period of the EFM signal as shown in FIG. 4. In addition to the subcode sync signal SB-SYNC, the PLL circuit 15d also produces a sync signal which is used in the servo control of the rotational driving of the disk 2.

Figure 5:
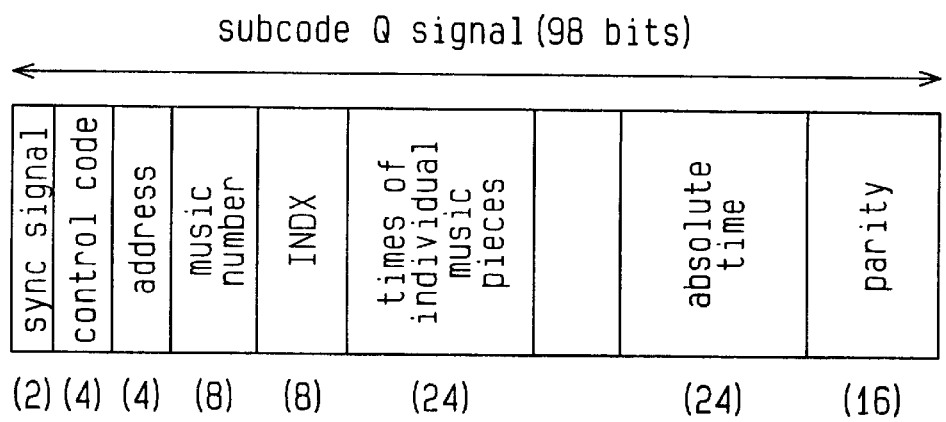
FIG. 5 is a diagram showing the format of a subcode signal.

The subcode reading circuit 15e receives the subcode data frame by frame and supplies the subcode data to the shockproof controller 16. The subcode data includes eight signals (or channels) P, Q, R, . . . and W among which only the Q signal is used. Ninety-eight (98) frames (or 98 bits) of the subcode Q signals are treated as a single information block. The subcode reading circuit 15e supplies the subcode Q signal (98 bits) to the shockproof controller 16. FIG. 5 illustrates the format of the subcode Q signal, wherein 2 bits are assigned for a sync signal, 4 bits are assigned for a control code, 4 bits are assigned for an address, 8 bits are assigned for a music number, 8 bits are assigned for an index, 24 bits are assigned for the time of each music piece, 24 bits are assigned for the absolute time, and 16 bits are assigned for error correction parity.

As shown in FIG. 2, the shockproof controller 16 includes a DSP (Digital Signal Processing) interface circuit 16a, an audio data reproduction circuit 16b and an address manager 16c. The DSP interface circuit 16a, which serves as an interface with the digital signal processor 15, sequentially receives digital audio data from the CIRC decoder 15c and writes the data into the buffer RAM 17. This writing operation is executed in such a way as to be synchronous with the signal processing of the digital signal processor 15 and the reading operation of the analog signal processor 14. The audio data reproduction circuit 16b reads the audio data which has been written in the buffer RAM 17 through the DSP interface circuit 16a at a given (constant) period, and outputs the audio data to a D/A converter 30. The data transfer rate (or period) when audio data is written into the buffer RAM 17 from the interface circuit 16a is designed to be faster (or shorter) than the data transfer rate (or period) when reading audio data from the buffer RAM 17 and supplying it to the audio data reproduction circuit 16d. This allows the audio data reproduction circuit 16b to read audio data from the buffer RAM 17 and continuously supply the audio data for a predetermined period of time even if writing of audio data is interrupted. This reading operation is executed in synchronism with a clock signal of a given period which is supplied from an external clock generator 31, irrespective of the writing operation of the interface circuit 16a. This clock generator 31 may be incorporated in the shockproof controller 16.

The address manager 16c manages the write address from the DSP interface circuit 16a and the read address from the audio data reproduction circuit 16b in such a manner that the amount of audio data to be stored in the buffer RAM 17 falls within a given range. Based on those addresses, the manager 16c instructs the control microcomputer 18 to stop reading data from the disk 12 when the buffer RAM 17 becomes full. The manager 16c instructs the microcomputer 18 to restart reading data when the amount of audio data stored in the buffer RAM 17 becomes smaller than a predetermined amount.

Further, the manager 16c receives subcode data from the subcode reading circuit 15e and temporarily stores time information (the times of the individual music pieces and the absolute time) in the subcode data. In other words, the manager 16c stores time information about the audio data which is currently written into the buffer RAM 17 from the DSP interface circuit 16a. This time information is referred to when determining the timing of restarting the writing of audio data into the buffer RAM 17. When writing audio data into the buffer RAM 17 is temporarily stopped due to external vibration, for example, the manager 16c acquires first time information from subcode data associated with the first audio data that has been written last, and temporarily stores the first time information. When receiving subcode data containing second time information (which sequentially follows the first time information), the manager 16c instructs the control microcomputer 18 to restart writing second audio data associated with that subcode data containing the second time information. The determination of the write timing according to this subcode data may be executed by the control microcomputer 18 instead of the address manager 16c. In this case, subcode data is supplied to the microcomputer 18, not the address manager 16c.

The control microcomputer 18 has a single chip architecture, and incorporates a memory where a program for controlling the individual circuits 13–16 is stored. In accordance with this program, the control microcomputer 18 sets the processing timings of the individual circuits 13–16 and controls the circuits 13–16 in such a way that those processing timings are synchronous with one another. When data read from the disk 12 becomes discontinuous due to the deviation of the read position of the CD pickup 11, the control microcomputer 18 temporarily stops the reading operation based on discontinuous EFM signals. Then, the control microcomputer 18 supplies to the pickup controller 13 a signal to return the CD pickup 11 to the original (unshifted) position from the shifted read position. At this time, audio data is stored in the buffer RAM 17 at a faster rate than the speed at which it is read out. Even though writing audio data is stopped, therefore, the audio data reproduction circuit 16b continuously reads audio data from the buffer RAM 17 while the CD pickup 11 returns to the original position. As a result, audio data can be continuously supplied to the D/A converter 30. At the same time, the control microcomputer 18 supplies to the shockproof controller 16 a signal to restart the writing of audio data into the buffer RAM 17 from the DSP interface circuit 16a.

When writing audio data is stopped, the address manager 16c temporarily stores the first time information of the first audio data that has been stored last in the buffer RAM 17. When the CD pickup 11 returns to the original position and the manager 16c receives the second time information, the manager 16c determines that writing the second audio data associated with the second time information should now be restated. The second time information is the time information which next follows the first time information. The second audio data is continuously supplied timely following the first audio data. In accordance with this determination, the control microcomputer 18 controls the DSP interface circuit 16a to write the second audio data into the buffer RAM 17.

The use of the time information by the invention is advantageous because the amount of data storage needed is substantially smaller than the amount of audio data storage otherwise conventionally required. Hence, the data reproduction apparatus according to the invention reduces the occupying area of the circuitry that determines the restart timing for writing audio data. The use of the time information also ensures the accurate and fast determination of the restart timing, thus improving the reliability of the write control.

Second Embodiment

Figure 6:
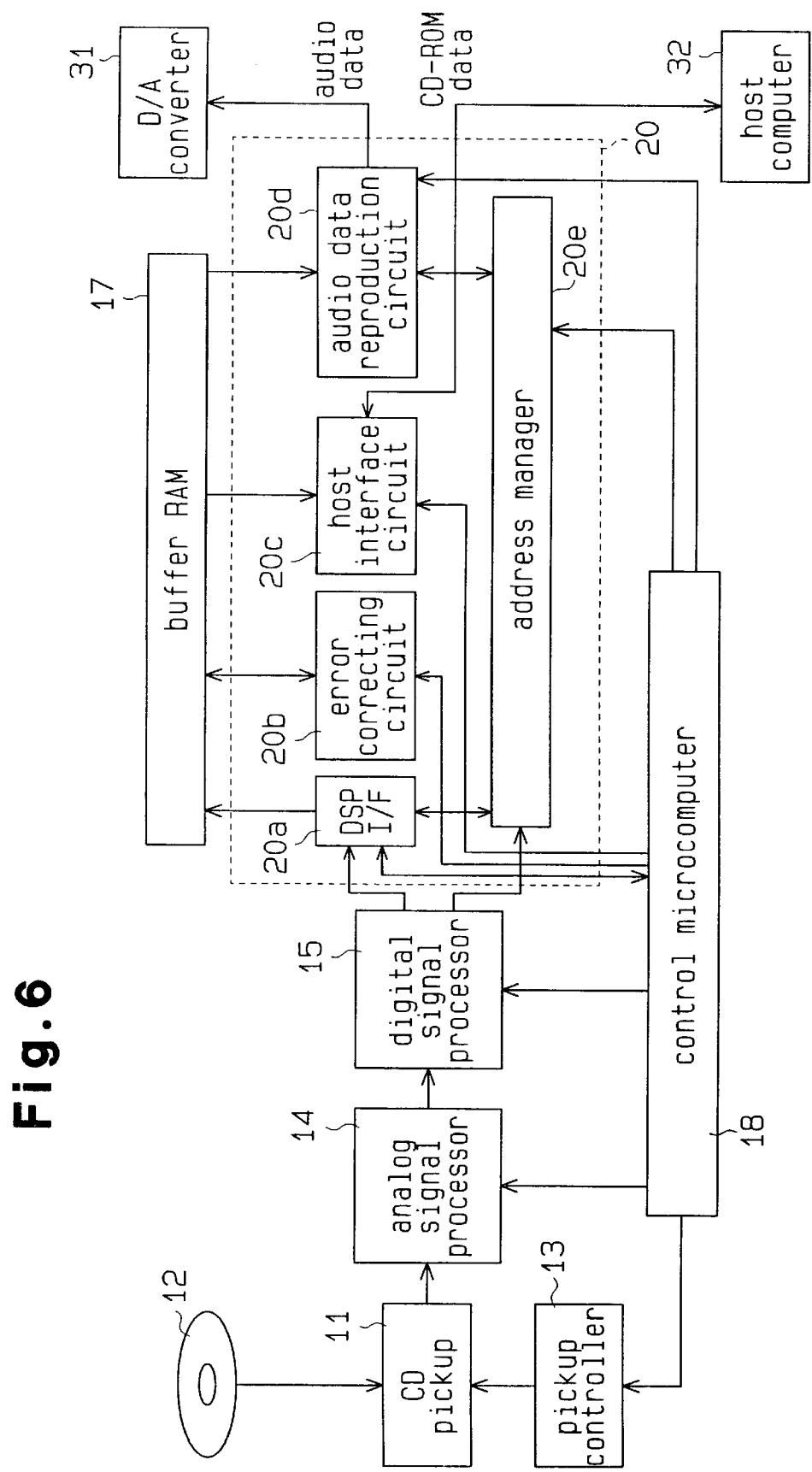
FIG. 6 is a block diagram illustrating a CD and CD-ROM data reproduction apparatus for use in a CD-ROM system according to a second embodiment of the invention.
Figure 7:
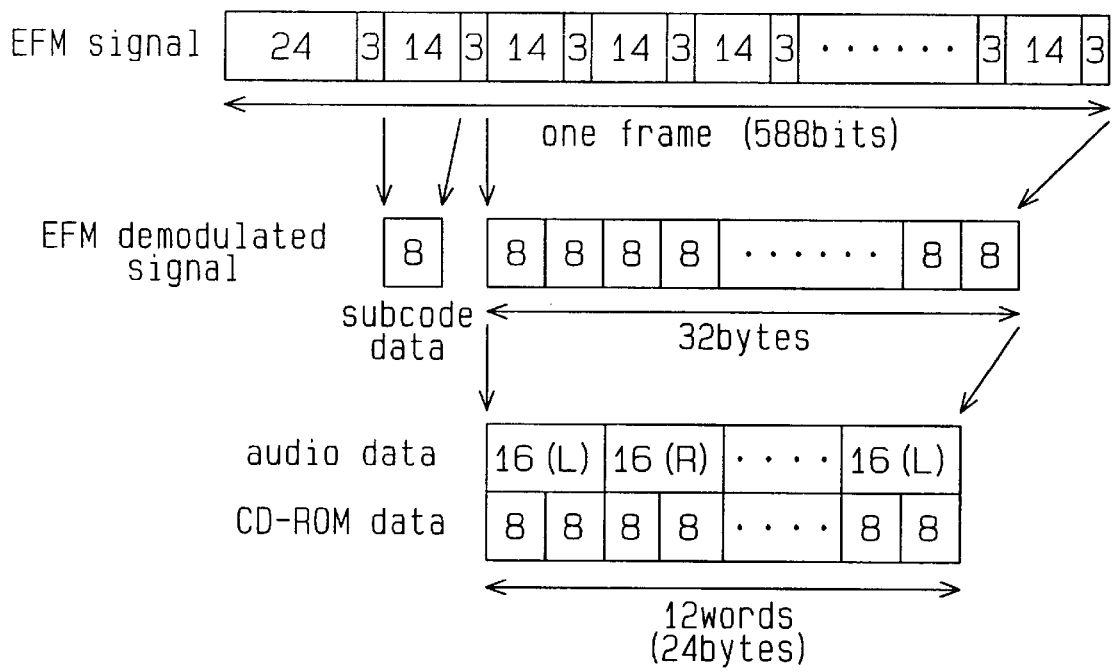
FIG. 7 is a diagram depicting how data read from a CD and CD-ROM are processed.
Figure 8:
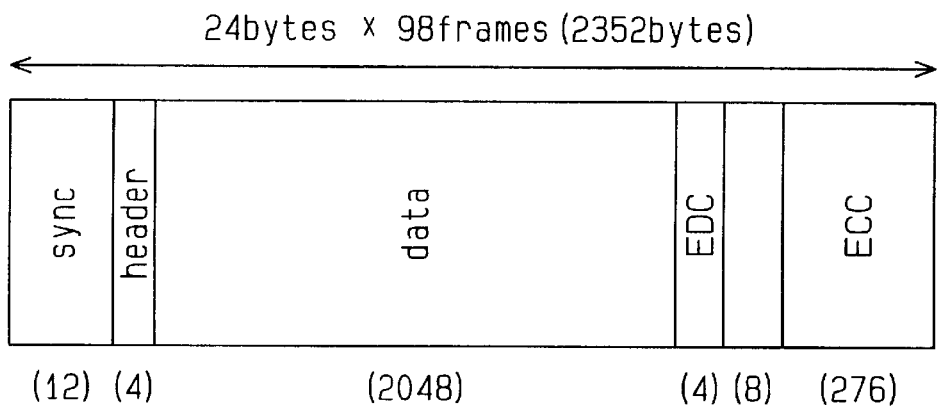
FIG. 8 is a diagram showing the format of CD-ROM data.

FIG. 6 presents a block diagram illustrating a data reproduction apparatus for use in a CD-ROM (Compact Disk-Read Only Memory) system according to a second embodiment of the invention. The data reproduction apparatus is designed so that a CD and a CD-ROM are compatible with each other. To avoid redundant description, like or same reference numerals are given to those components which are the same as the corresponding components of the first embodiment. The data reproduction apparatus according to the second embodiment reproduces data from a CD-ROM used as a read-only memory (ROM) for computers and data from a CD used in an audio system. The CD-ROM system and audio system share the CD pickup 11, the pickup controller 13, the analog signal processor 14 and the digital signal processor 15. The CIRC decoder 15c in the digital signal processor 15 selectively produces digital audio data and digital CD-ROM data in accordance with the type of information recorded on the disk 12. As shown in FIG. 7, audio data consisting of 12 words per sector or CD-ROM data consisting of 24 bytes per sector is produced from main data containing 32 bytes per sector. Here, 2352 bytes (24 bytes ×98 frames) of CD-ROM data (mode 1) are treated as one block. Within one block of CD-ROM data, 12 bytes are assigned for a sync signal, 4 bytes are assigned for a header, 2048 bytes for user data, 4 bits are assigned for an error detection code EDC and 276 bytes are assigned for an error correction code ECC. The 2340 bytes of data in one block of CD-ROM data, just excluding the 12-byte sync signal, have been subjected to a scramble process at the time the CD-ROM data are recorded.

The data reproduction apparatus according to the second embodiment has a CD-ROM decoder 20 which has a function of the shockproof control of audio data as well as a function of performing error correction on CD-ROM data. The CD-ROM decoder 20 has a DSP interface circuit 20a, an error correcting circuit 20b, a host interface circuit (or an output interface circuit) 20c, an audio data reproduction circuit 20d and an address manager 20e. The DSP interface circuit 20a serves as an interface with the digital signal processor 15. The DSP interface circuit 20a detects a sync signal contained in the received data (CD-ROM data or audio data), and produces a system clock signal in accordance with the sync signal. This system clock signal is used by the control microcomputer 18 to determine the operation timings of the individual circuits 20b to 20e. The DSP interface circuit 20a receives CD-ROM data from the digital signal processor 15 block by block and executes a descramble process on 2340-byte data in each block. Then, the CD-ROM data is written in the buffer RAM 17. When receiving audio digital data from the signal processor 15, the. DSP interface circuit 20a writes the audio digital data directly into the buffer RAM 17.

The error correcting circuit 20b reads CD-ROM data from the buffer RAM 17 block by block (98 frames), and executes an error correcting process using the error detection code EDC and the error correction code ECC. Further, the error correcting circuit 20b rewrites erroneous data in the CD-ROM data stored in the buffer RAM 17 to corrected data. While audio data is being supplied to the DSP interface circuit 20a from the digital signal processor 15, the control microcomputer 18 controls the error correcting circuit 20b so as to stop its operation. The host interface circuit 20c reads CD-ROM data, error-corrected by the error correcting circuit 20b, from the buffer RAM 17 and supplies the CD-ROM data to an external host computer 32. The interface circuit 20c also receives various kinds of command signals from the host computer 32 and supplies them to the control microcomputer 18. The audio data reproduction circuit 20d continuously reads audio data from the buffer RAM 17 in a given period, and supplies it to the D/A converter 31. The address manager 20e and audio data reproduction circuit 20d perform the same operations as the address manager 16c and audio data reproduction circuit 16b in the shockproof controller 16 according to the first embodiment.

The control microcomputer 18 receives subcode data from the digital signal processor 15, and controls the CD-ROM decoder 20 so as to selectively execute an operation according to CD-ROM data and an operation according to audio data, based on the control code in the subcode data. When receiving CD-ROM data from the digital signal processor 15, the microcomputer 18 controls the DSP interface circuit 20a, the error correcting circuit 20b and the host interface circuit 20c so as to enable those circuits 20a–20c. The CD-ROM data is written in the buffer RAM 17 by the DSP interface circuit 20a, and is subjected to an error correcting process by the error correcting circuit 20b. The error-corrected CD-ROM data is supplied to the host computer 32 from the host interface circuit 20c. When receiving a signal instructing the supply of CD-ROM data recorded at a specific position on the disk 12 from the host computer 32, the control microcomputer 18 gives an instruction to the pickup controller 13 in response to that signal. The CD-ROM data at a specific position, which has been read from the disk in accordance with that instruction, is subjected again to an error correcting process and is then supplied to the host computer 32.

When receiving audio data from the digital signal processor 15, the control microcomputer 18 controls the DSP interface circuit 20a, the audio data reproduction circuit 20d and the address manager 20e so as to enable those circuits 20a, 20d and 20e. The audio data is intermittently written in the buffer RAM 17 by the DSP interface circuit 20a in a first period, and is continuously read from the buffer RAM 17 by the audio data reproduction circuit 20d in a given (constant) second period longer than the first period. Consequently, the time (time base) associated with reading the audio data is extended.

It is apparent from the above that the CD-ROM decoder 20 does not simultaneously perform an error correction process on CD-ROM data and a shockproof operation of audio data. This design can allow the buffer RAM 17 to be shared by the error correction process and shockproof control to thereby prevent the memory capacity of the buffer RAM 17 from increasing. In the normal operation, the error correction requires a capacity of approximately one to two Mbits, while the shockproof operation needs a capacity of approximately two to four Mbits. Therefore, the buffer RAM 17 should have a maximum capacity of 4 Mbits. With this structure, the occupying area of the CD-ROM decoder 20 is not substantially increased by providing the shockproof function. This savings in area contributes to reducing the cost of the CD-ROM system. Further, the extension of time associated with reading the audio data with shockproof function allows the CD-ROM decoder 20 to easily handle the disk 12 that records the audio digital data and the CD-ROM digital data.

Although only two embodiments of the present invention have been described herein, it should be apparent to those skilled in the art that the present invention may be embodied in many other specific forms without departing from the spirit or scope of the invention. Particularly, it should be understood that this invention may be embodied in the following forms.

This invention may be adapted to a CD-ROM system that reads audio digital data and CD-ROM digital data from a single disk rotated at a high speed of several times (for example eight times or twelve times) as fast as a normal speed. In this case, the audio and CD-ROM data are continuously read from the disk by performing the extension of time while the CD-ROM system maintains the rotation speed of the disk high. Consequently, there is no need to change the rotation speed of the disk between high speed and normal speed. This decreases the load to a spindle motor that rotates the disk and reduces the cost necessary for the servo control of the spindle motor. In the conventional CD-ROM system which has no shockproof function, there is a need to change the rotation speed from the high speed to the normal speed in order to reproduce the audio data at the eight times speed or twelve times speed. The change of speed increases the load to the spindle motor and makes the control of motor servo system unstable. Accordingly, it is actually difficult to change the speed.

Therefore, the present examples and embodiments are to be considered as illustrative and not restrictive, and the invention is not to be limited to the details given herein, but may be modified within the scope of the appended claims.

What is claimed is:

1. A data reproduction apparatus comprising:
   a reading unit for optically reading data recorded on a disk as a recording medium;
   a first signal processing circuit for producing a format data signal based on said data read by said reading unit;
   a second signal processing circuit for performing a demodulation process on said format data signal supplied from said first signal processing circuit to produce a demodulated format data signal including main data and subcode data, for producing a main data signal and a subcode data signal from said demodulated format data signal, and for subjecting said main data signal to a decoding process to produce a reproduced data signal;
   a buffer memory for temporally storing the reproduced data signal;
   a shockproof controller, coupled between said second signal processing circuit and said buffer memory, for controlling the writing and reading of the reproduced data signal into and from said buffer memory; and
   an operation controller, coupled to said reading unit, said first and second signal processing circuits and said shockproof controller, wherein when said format data signal produced by said first signal processing circuit is interrupted, said operation controller causes said shockproof controller to stop the writing of the reproduced data signal in said buffer memory and causes said reading unit to repeat the reading of the data associated with the interrupted format data signal,
   wherein one of said operation controller and said shockproof controller receives said subcode data signal from said second signal processing circuit, and determines when said shockproof controller should restart writing into said buffer memory the reproduced data signal associated with the repeated reading of the data associated with the interrupted format data signal, with reference to the received subcode data signal.

2. The data reproduction apparatus according to claim 1, wherein said operation controller synchronizes operations of said first and second signal processing circuits with a reading operation of said reading unit and controls said second signal processing circuit to synchronize the reproduced data signal supplied to said shockproof controller with the subcode data signal supplied to one of said operation controller and said shockproof controller.

3. The data reproduction apparatus according to claim 1, wherein said reading unit selectively reads first data and second data which are respectively recorded on different disks, wherein said second signal processing circuit selectively produces a first reproduced data signal corresponding to said first data and a second reproduced data signal corresponding to said second data,
   wherein said shockproof controller includes,
      an input interface circuit for receiving one of said first and second reproduced data signals to write it in said buffer memory;
      a reproduction circuit for reading said first reproduced data signal from said buffer memory to output it therefrom at a predetermined constant period;
      an error correction circuit for correcting a code error contained in said second reproduced data signal stored in said buffer memory; and
      an output interface circuit for reading said error-corrected second reproduced data signal from said buffer memory to output it therefrom, and
   wherein said operation controller allows one of said reproduction circuit and said output interface circuit to be selectively activated in accordance with the subcode data associated with one of said first and second reproduced data signals.

4. The data reproduction apparatus according to claim 3, wherein said first data is originated from an audio CD and said second data is originated from a CD-ROM.

5. A CD-ROM decoder for use in a data reproduction apparatus having a buffer memory storing data read from a disk as a recording medium, said data including at least one of audio digital data and CD-ROM digital data, said CD-ROM decoder comprising:
   an input interface for providing one of said audio and said CD-ROM digital data to said buffer memory;
   an error correction circuit for correcting an error contained in said CD-ROM digital data stored in said buffer memory;
   an output interface circuit for transferring said error-corrected CD-ROM digital data from said buffer memory to an external computer;
   an audio data reproduction circuit for reading said audio digital data from said buffer memory to output it therefrom at a predetermined constant period, wherein said output interface circuit and said audio data reproduction circuit are coupled to said buffer memory in parallel; and
   an operation controller for controlling said output interface circuit and said audio data reproduction circuit, wherein said operation controller allows said output interface circuit to operate when said data includes said CD-ROM digital data and allows said audio data reproduction circuit to operate when said data includes said audio digital data before said CD-ROM data is sent to said error correction circuit.

6. The CD-ROM decoder according to claim 5, wherein said input interface intermittently writes said audio digital data into said buffer memory in a first period and wherein said audio data reproduction circuit continuously reads said audio digital data from said buffer memory in a second period which is longer than said first period.

7. The CD-ROM decoder according to claim 5, wherein said operation controller prohibits said error correction circuit to operate when said data includes said audio digital data.

* * * * *